(12) United States Patent
Bae et al.

(10) Patent No.: US 7,823,419 B2
(45) Date of Patent: Nov. 2, 2010

(54) OPTICAL FIBER DRAWING FURNACE WITH GAS FLOW TUBES

(75) Inventors: Sang-Joon Bae, Ansan-si (KR); Young-Il Kwon, Seoul (KR); Joon-Keun Lee, Seoul (KR); Chul-Min Kim, Suwon-si (KR); Myung-Ho Jang, Gyeongsangbuk-do (KR)

(73) Assignee: LS Cable Ltd., Gyeonggi-do (KR)

( * ) Notice: Subject to any disclaimer, the term of this patent is extended or adjusted under 35 U.S.C. 154(b) by 124 days.

(21) Appl. No.: 12/365,057

(22) Filed: Feb. 3, 2009

(65) Prior Publication Data
US 2009/0145169 A1 Jun. 11, 2009

Related U.S. Application Data

(62) Division of application No. 10/420,374, filed on Apr. 22, 2003, now abandoned.

(30) Foreign Application Priority Data
Aug. 31, 2002 (KR) .............................. 2002-52300

(51) Int. Cl.
*C03B 37/029* (2006.01)
(52) U.S. Cl. .............................. 65/513; 65/537; 65/538; 118/718
(58) Field of Classification Search ............... 65/538, 65/537, 435, 513, 481; 118/718
See application file for complete search history.

(56) References Cited

U.S. PATENT DOCUMENTS 4,096,823 A * 6/1978 Schladitz .................... 118/718
4,437,870 A * 3/1984 Miller .......................... 65/491
4,673,427 A * 6/1987 Van Der Giessen et al. ... 65/424
6,029,476 A * 2/2000 Bourhis et al. ................ 65/413
6,257,023 B1 * 7/2001 Uhm et al. .................... 65/537
2007/0113589 A1 * 5/2007 Paganessi .................... 65/434

FOREIGN PATENT DOCUMENTS

JP 59-217641 * 12/1984
JP 5-279070 * 10/1993

* cited by examiner

*Primary Examiner*—John Hoffmann
(74) *Attorney, Agent, or Firm*—Sherr & Vaughn, PLLC (57) ABSTRACT

A furnace for drawing an optical fiber includes a body having an upper and lower openings for supplying a preform and discharging a drawn optical fiber, a heating unit installed in the body for receiving and melting the preform, an atmosphere blocking tube installed to the lower opening for discharging the drawn optical fiber and blocking the optical fiber from the atmosphere, an upper introduction port formed at an upper portion of the body for introducing an inert gas toward the preform and partially discharged outside through a gap between the preform and the upper opening, a central and lower introduction ports formed at central and lower portions for introducing an inert gas into the body, a first flow guiding means for guiding the inert gas introduced through the central introduction port upward and then flowed down along a surface of the preform, and a second flow guiding means for guiding the inert gas introduced through the lower introduction port upward and then discharged outside through the atmosphere blocking tube along a surface of the drawn optical fiber.

7 Claims, 5 Drawing Sheets

OPTICAL FIBER DRAWING FURNACE WITH GAS FLOW TUBES

The present application is a Divisional Application of pending U.S. patent application Ser. No. 10/420,374, filed on Apr. 22, 2003, herein incorporated by reference.

BACKGROUND OF THE INVENTION

1. Field of the Invention

The present invention relates to a fiber-drawing furnace for melting and drawing an optical fiber preform to make an optical fiber and its drawing method, and more particularly to a fiber-drawing furnace for drawing an optical fiber having low Polarization Mode Dispersion (PMD) by decreasing diameter variations and non-circularity of the optical fiber and a method for drawing an optical fiber using the furnace.

2. Description of the Related Art

Generally, an optical fiber is manufactured by drawing a transparent glass-sintered material, called an optical fiber preform, in a furnace at a high temperature. As well known in the art, a resistance furnace and an induction furnace are commonly used in drawing the optical fiber preform.

The furnace has a graphite core tube positioned vertically in a work place for receiving a preform supplied through an upper opening thereof. The graphite core tube is heated by resistance heating or induction heating and acts as a heating body. The graphite core tube is commonly heated up to 2,100~2,300° C. in order to melt the preform and draw an optical fiber from the preform. Under such a high temperature, the graphite core tube may be easily oxidized. Thus, the core tube should be maintained in a non-oxidizing circumstance using helium, nitrogen, argon and the like for the prevention of oxidization.

In the furnace, $SiO_2$ and C particles separated from the graphite core tube and the transparent glass preform react to thereby create SiC particles. If the silicon carbides or carbon particles adhere to the preform, a tensile strength at the adhered position is considerably reduced, which causes break of the optical fiber during a drawing process. In addition, a melt vapor generated from the preform can adhere to an inner wall of the graphite core tube and damage it.

To prevent such problems, an inert gas is relatively strongly blown into the furnace. The flow of an inert gas has a profound influence on the optical fiber formation. In other words, the inert gas introduced into the furnace creates a turbulence flow, particularly strongly at a neck-down zone where the optical fiber preform is melt and reduces its section abruptly. Such a flow of the gas becomes irregular in the circumferential direction of the preform. Therefore, a diameter of the preform near the neck-down zone varies irregularly, and a drawn optical fiber thus has an irregular diameter with an increase in the non-circularity.

An optical fiber drawn from the preform is cooled while moving down below a drawing device. At this time, a boundary layer of the inert gas formed on a surface of the optical fiber gives an influence on the cooling of the optical fiber. The inert gas introduced into the furnace cannot form a uniform laminar flow on the surface of the drawn optical fiber. This makes the optical fiber cooled irregularly in the circumferential direction, so increases variations in the diameter of the optical fiber.

As well known in the art, if a perfect circular symmetry of the optical fiber is not achieved, it may give rise to a birefringence during a signal transmission through the optical fiber, resulting in Polarization Mode Dispersion (PMD) which adversely affects high-speed optical transmission characteristics.

In order to provide a uniform laminar flow on an optical fiber preform, there is proposed a structure in which an upper end of the core tube for passage of the preform is sealed and an inert gas flows from an upper portion to a lower portion. German Patent DE-A 37 31 347 discloses a sealing structure in which a diaphragm ensures gastightness at the upper end of the core tube. This gastightness is achieved by the diaphragm which is provided with nozzles for injecting combustible gas that is ignited. However, this gastight device is too complex to install and also shows difficulty in accurately guiding the preform to a center of the furnace.

To decrease the diameter variations, there is also suggested a method for slowly cooling a drawn optical fiber until the optical fiber moves out of the furnace. In this slow cooling process, it is important to prevent a turbulent flow of the inert gas and maintain a uniform laminar flow in order to perform the uniform cooling. U.S. Pat. No. 5,637,130 issued to Nagayama et al. discloses a technique in which a cylindrical member is formed at a lower portion inside a furnace in order to cool the drawn optical fiber slowly and control a flow of the inert gas. However, sufficient cooling and uniform laminar flow cannot be obtained only by means of the cylindrical member. Particularly, impurity particles generated in the furnace cannot be fully discharged due to the cylindrical member, but stick to the preform or the optical fiber, causing frequent break.

SUMMARY OF THE INVENTION

The present invention is designed to overcome the above problems of the prior art, and an object of the invention is to provide a furnace for drawing an optical fiber which may not only provide a uniform gas flow of an inert gas inside the furnace with a simple structure but also fully discharge impurities generated in the furnace outward in order to improve reliability of a drawn optical fiber, and a method for drawing an optical fiber using the furnace.

According to the present invention, an inner space of the furnace is isolated from the atmosphere due to the gas injected through an upper introduction port, and impurity particles generated in the furnace is carried upward and discharged outside due to an inert gas injected through a central introduction port. In addition, an inert gas injected through a lower introduction port formed at a lower end of the furnace isolates a drawn optical fiber from the atmosphere and gives a uniform laminar flow on a surface of the drawn optical fiber.

According to the present invention, the drawn optical fiber is slowly cooled while moving through an atmosphere blocking tube and has reduced diameter variations because of the uniform laminar flow formed on its surface. For this reason, a length of the atmosphere blocking tube is set depending on a drawing speed in a preferred embodiment of the present invention.

In an aspect of the present invention, there is provided a furnace for drawing an optical fiber which includes a furnace body having an upper opening for supplying a preform and a lower opening for discharging an optical fiber drawn from the preform; heating means installed in the furnace body, the heating means receiving and melting the preform therein in order to draw the preform; an atmosphere blocking tube installed at the lower opening for ensuring the passage of the drawn optical fiber therein, the atmosphere blocking tube protecting the drawn optical fiber from the external atmosphere; an upper introduction port formed at an upper portion of the furnace body for introducing an inert gas toward the preform, the inert gas being partially discharged outside through a gap between the preform and the upper opening; a central introduction port formed at a central portion of the furnace body for introducing an inert gas into the furnace body; a lower introduction port formed at a lower portion of the furnace body for introducing an inert gas into the furnace body; a first flow guiding means for guiding the inert gas introduced through the central introduction port upward along the melting area of the heating means so that the inert gas collides with the inert gas introduced through the upper introduction port and then flows toward a lower portion of the furnace body along the surface of the preform; and a second flow guiding means for guiding the inert gas introduced through the lower introduction port upward along the melting area of the heating means so that the inert gas collides with the inert gas introduced through the central introduction port and is then discharged outside through the atmosphere blocking tube along the surface of the drawn optical fiber.

Preferably, the heating means includes a first graphite core tube installed spaced apart from the wall of the furnace body in order to form the melting area therein for receiving and melting the preform; and a second graphite core tube installed, spaced apart from the wall of the furnace body, at a lower portion of the first graphite core tube.

More preferably, the first graphite core tube heats at a temperature of 2,100~2,300° C., and the second graphite core tube heats at a temperature of 1,600~1,800° C. In addition, the second core tube may indirectly irradiate heat transferred from the first graphite core tube, not heating by oneself.

At this time, the first flow guiding means include a passage between the first graphite core tube and the wall of the furnace near the central introduction port; a support flange extended from the wall of the furnace body for supporting the second graphite core tube; and a passage formed between the first and second graphite core tubes in which an upper end of the second graphite core tube having a diameter smaller than the first graphite core tube is partially inserted into the first graphite core tube.

In addition, the second flow guiding means includes a passage formed between the second graphite core tube and the wall of the furnace body near the lower introduction port; and a passage formed between the atmosphere blocking tube and the second graphite core tube.

According to a preferred embodiment of the present invention, a flow rate of the inert gas at the central introduction port is 3~4 times as large as a flow rate of the inert gas at the upper introduction port, and a flow rate of the inert gas at the lower introduction port is 2~3 times as large as a flow rate of the inert gas at the upper introduction port.

Preferably, the atmosphere blocking tube is as long as the drawn optical fiber has a temperature of about 1,200~1,300° C. at the exit of the atmosphere blocking tube, and more preferably the length of the atmosphere blocking tube is in the range of 2.0~2.5 m.

According to another aspect of the invention, there is provided a furnace for drawing an optical fiber which includes a furnace body having an upper opening for supplying a preform and a lower opening for discharging an optical fiber drawn from the preform; a first core tube installed spaced apart from the wall of the furnace body to form a first passage between the first core tube and the wall of the furnace body, the first core tube forming a melting area therein to heat and melt the preform; a second core tube installed spaced apart from the wall of the furnace body to form a second passage between the second core tube and the wall of the furnace body, the second core tube having a diameter smaller than the first core tube so as to be partially inserted into a lower end of the first core tube to thereby form a third passage between the first and second core tubes; an upper introduction port formed at an upper portion of the furnace body for introducing an inert gas toward the preform, the inert gas being partially discharged outside through a gap between the preform and the upper opening; a central introduction port communicated with the first passage formed between the first core tube and the wall of the furnace body for introducing an inert gas into the first passage; a lower introduction port communicated with the second passage formed between the second core tube and the wall of the furnace body for introducing an inert gas into the second passage; a support flange interposed between the first and second passage to divide the first and second passages; and an atmosphere blocking tube installed at the lower opening for forming a fourth passage in which the inert gas introduced through the second passage flows between the second core tube and the atmosphere blocking tube, the atmosphere blocking tube ensuring the passage of the drawn optical fiber therein to protect the drawn optical fiber from the external atmosphere.

According to still another aspect of the invention, there is also provided a method for drawing an optical fiber by melting a preform in a furnace which includes a furnace body having an upper opening for supplying a preform, a lower opening for discharging an optical fiber drawn from the preform, and upper, central and lower introduction ports for introducing an inert gas; heating means installed in the furnace body to receive and melt the preform in a melting area therein; and an atmosphere blocking tube installed at the lower opening to ensure the passage of the drawn optical fiber therein, wherein the method includes the steps of (a) supplying a preform into the melting area through the upper opening; (b) melting the preform by heating the preform with the heating means; (c) drawing an optical fiber from a melted portion of the preform at its lower end; (d) introducing an inert gas through the upper introduction port so that the inert gas is partially discharged outside through a gap between the preform and the upper opening; (e) introducing an inert gas through the central introduction port so that the inert gas flows upward in the melting area and collides with the flow of inert gas introduced through the upper introduction port, and then flows downward along a surface of the preform; and (f) introducing an inert gas through the lower introduction port so that the inert gas flows upward along the melting area and then collides with the inert gas introduced through the central introduction port, and is then discharged outside through the atmosphere blocking tube along the surface of the drawn optical fiber.

Preferably, the step (e) includes the steps of supplying an inert gas through a passage formed between a wall of the furnace body and a first cylindrical core tube installed in the furnace body; and guiding the inert gas, having passed through the passage between the wall of the furnace body and the first core tube, to an upper portion of the melting area through a passage between an inner side of the first core tube and an outer side of an upper portion of a second core tube installed in the furnace body wherein an upper end of the second core tube is partially inserted into a lower end of the first core tube.

Also preferably, the step (f) includes the steps of supplying an inert gas through a passage formed between a wall of the furnace body and the second core tube; and guiding the inert gas, having passed through the passage between the wall of the furnace body and the second core tube, to an upper portion of the melting area through a passage formed between the atmosphere blocking tube and the second core tube.

BRIEF DESCRIPTION OF THE DRAWINGS

These and other features, aspects, and advantages of the present invention will become better understood with regard to the following description, appended claims, and accompanying drawings, in which like components are referred to by like reference numerals. In the drawings:

FIGS. 4A to 4C show simulation results of an inert gas flow in the optical fiber drawing furnace according to a preferred embodiment of the present invention, in which FIGS. 5A to 5C show simulation results of flow velocity distributions of the inert gas in the optical fiber drawing furnace according to a preferred embodiment of the present invention, in which

DETAILED DESCRIPTION OF THE INVENTION

Hereinafter, preferred embodiments of the present invention will be described in detail with reference to the accompanying drawings.

Figure 1:
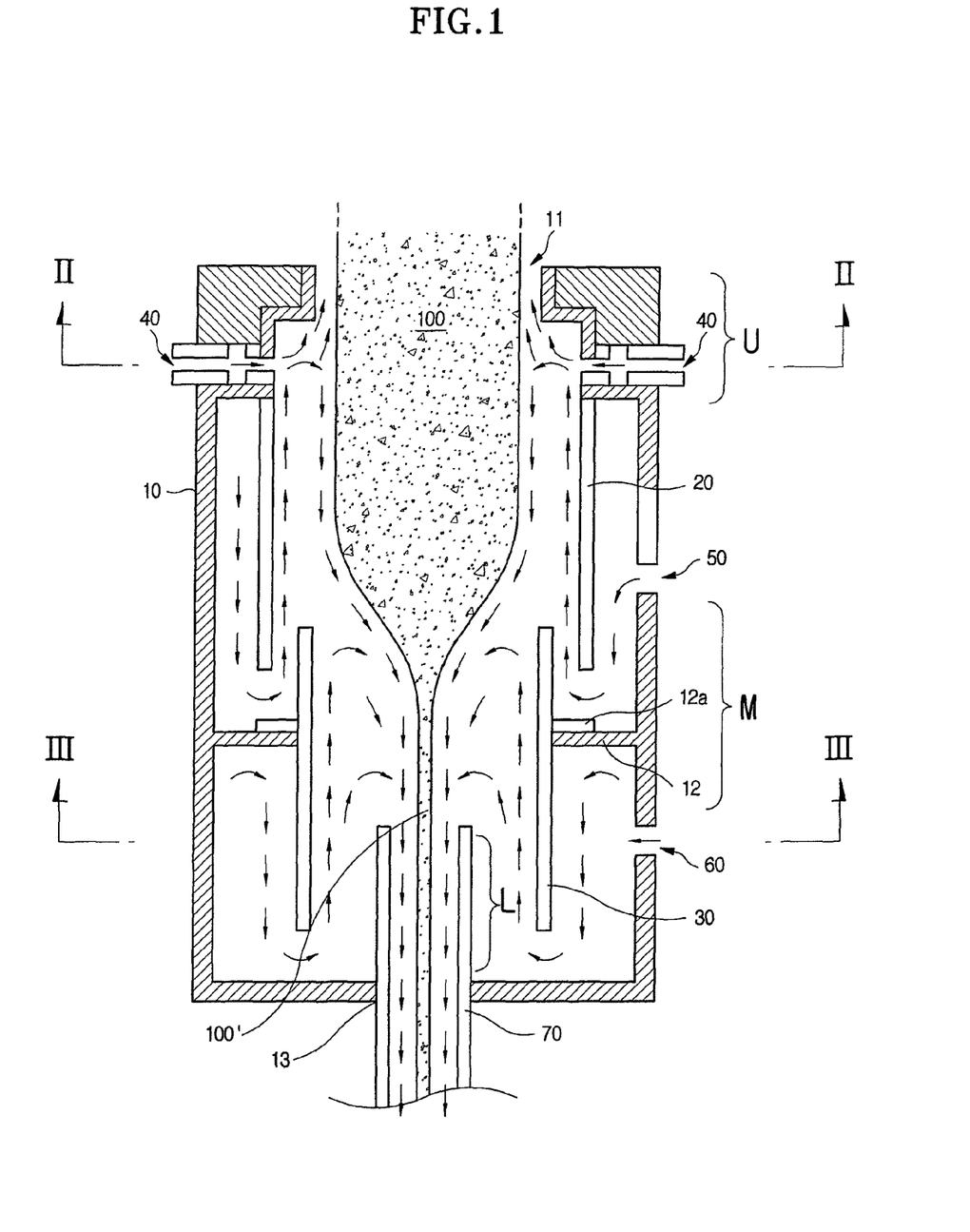
FIG. 1 is a side sectional view showing a configuration of an optical fiber drawing furnace according to a preferred embodiment of the present invention.

FIG. 1 shows a schematic configuration of a furnace for drawing an optical fiber according to a preferred embodiment of the present invention. Referring to FIG. 1, the optical fiber drawing furnace preferably has a cylindrical furnace body 10, generally made of stainless steel. An upper opening 11 is formed at a top end of the furnace body 10 for supplying a preform 100 into the furnace, and a lower opening 13 is formed at a bottom of the furnace body 10 through which an optical fiber 100' drawn from the preform 100 can pass.

In the furnace body 10, a heating unit is provided for receiving the supplied preform 100 in a heating area and then heating the preform 100 so as to be drawn into an optical fiber. Preferably, the heating unit includes first and second cylindrical graphite core tubes 20 and 30 fixed in the furnace body 10. The first and second graphite core tubes 20 and 30 receive the optical fiber preform 100 supplied from above by a supplying means (not shown). The graphite core tubes 20 and 30 heat the inner space of the furnace up to 2,100~2,300° C. by resistance of electricity supplied from a power resource (not shown) so as to melt the optical fiber preform 100. Preferably, the first graphite core tube 20 of the present invention heats at a temperature of 2,100~2,300° C., while the second graphite core tube 30 heats at a temperature of 1,600~1,800° C. In addition, the second graphite core tube 20 may indirectly irradiate the heat transferred from the first graphite core tube 20, not heating by oneself. As another example, the core tubes 20 and 30 can be heated by induction of coils (not shown) respectively installed in a space between the furnace body 10 and the core tubes 20 and 30.

According to this embodiment, the first graphite core tube 20 is spaced from a wall of the furnace body 10 in order to ensure a space for an inert gas to flow as described below. At this time, an upper end of the first core tube 20 is sealed with the furnace body 10, and a lower end is opened so that a gas in the space flows downward. The second graphite core tube 30 installed below the first graphite core tube 20 is also fixed to a support flange 12 extended from the furnace body 10 by using a fixing flange 12a so as to keep a space between the second graphite core tube 30 and a wall of the furnace body 10. A lower end of the second graphite core tube 30 is not contacted with a bottom of the furnace body 10 but spaced a predetermined distance from the bottom. Thus, the gas introduced through the space between the second core tube 30 and the wall of the furnace body 10 flows downward and then changes its flowing direction upward.

In this embodiment, the furnace body has a cylindrical shape. However, an auxiliary tube integrally connected to the furnace body can be further provided at a lower end of the furnace body, and this modification should be understood to be included in the scope of the invention.

Figure 2:
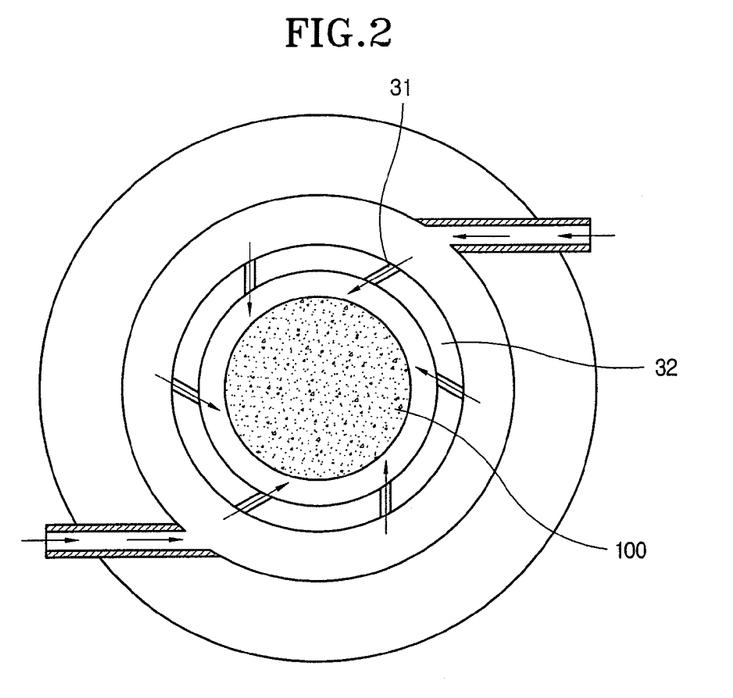
FIG. 2 is a sectional view taken along a II-II line of FIG. 1.

The furnace body 10 also has an upper introduction port 40, a central introduction port 50 and a lower introduction port 60 for blowing inert gases into the furnace body 10. The upper introduction port 40 is formed inwardly toward a surface of the preform 100 from the outside of the furnace body 10. Preferably, the upper introduction port 40 is formed in the tangential direction of the furnace as shown in FIG. 2, and a ring-shaped spraying sleeve 32 having a plurality of nozzles 31 is mounted to an upper portion of the furnace in order to supply the introduced gas evenly to the preform.

According to this embodiment, there is provided a first flow guiding means which guides the inert gas introduced through the central introduction port 50 upward along the melting area of the heating unit so that the inert gas collides with another inert gas introduced through the upper introduction port 40, and then flows down toward a lower portion of the furnace along a surface of the preform 100. The first flow guiding means may be formed by a passage between the first graphite core tube 20 and the furnace body 10 and a passage between the first and second graphite core tubes 20 and 30.

More specifically, the central introduction port 50 is communicated with the passage formed between the first graphite core tube 20 and the wall of the furnace body 10. In addition, the inside diameter of the first graphite core tube 20 is larger than the outer diameter of the second graphite core tube 30 so that the upper end of the second graphite core tube 30 may be inserted into the lower end of the first graphite core tube 20 by a predetermined length. Thus, there can be also formed a passage between the first and second core tubes 20 and 30 through which the inert gas may pass. Here, the support flange 12 blocks a space between the second core tube 30 and the wall of the furnace body 10, so the inert gas introduced through the central introduction port 50 flows down through the passage formed between the first core tube 20 and the wall of the furnace body 10 and then changes its flowing direction due to the support flange 12, and then flows upward to the upper portion of the melting area in the furnace along the passage between the first and second core tubes 20 and 30. Preferably, it is designed to ensure that the inert gas introduced through the central introduction port 50 flows upward near the neck-down zone of the preform 100.

On the other hand, the furnace of the present invention also includes a second flow guiding means which guides the inert gas introduced through the lower introduction port 60 upward along the melting area of the heating unit so that the inert gas collides with another inert gas introduced through the central introduction port 50 and is then discharged outside through an atmosphere blocking tube 70 along a surface of the drawn optical fiber 100'. Preferably, the second flow guiding means is realized by a passage between the second core tube 30 and the furnace body 10 as well as the atmosphere blocking tube 70.

Figure 3:
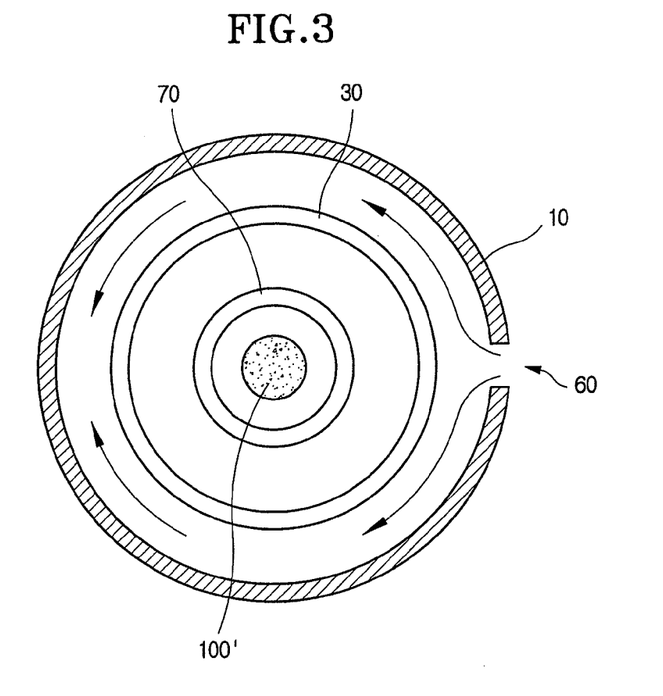
FIG. 3 is a sectional view taken along a III-III line of FIG. 1.

More specifically, the lower introduction port 60 is communicated with the passage formed between the second core tube 30 and the wall of the furnace body 10. FIG. 3 is a sectional view taken along the III-III line of FIG. 1, which shows a section of the furnace near the lower introduction port 60.

The atmosphere blocking tube 70 of the present invention is mounted to the lower opening 13 of the furnace body 10. The atmosphere blocking tube 70 protects the drawn optical fiber from the atmosphere to be cooled as slow as the clad of the drawn optical fiber has an enough viscosity to minimize the differential stress in the circumferential direction of the optical fiber, and guides the inert gas into a laminar flow.

The atmosphere blocking tube 70 is made of quartz or graphite so as to endure high temperature in the furnace. The outer diameter of the atmosphere blocking tube 70 is selected in a range of 15~50 mm depending on the flow rate of the inert gas. In this embodiment, a length of the atmosphere blocking tube 70 is adjustable according to a drawing speed of the optical fiber. Preferably, the atmosphere blocking tube 70 is as long as the drawn optical fiber has a temperature of about 1,200~1,300° C. at the exit of the atmosphere blocking tube 70. For example, if the drawing speed of the optical fiber is 25 m/sec, the atmosphere blocking tube 70 has a length of 1.5~2.5 mm, more preferably 2.0~2.5 m.

According to the present invention, a top end of the atmosphere blocking tube 70 is positioned within about 200~250 mm from the neck-down zone of the preform 100 so that the preform 100 is drawn into an optical fiber having a reduced section and then advances into the atmosphere blocking tube 70. This is helpful to maintain a uniform boundary layer of the gas near a surface of the optical fiber. If the atmosphere blocking tube 70 is too close to the neck-down zone of the preform, the flow of the inert gas becomes unstable. If too far from the neck-down zone, the atmosphere blocking tube 70 cannot bring forth a desired result.

With such a configuration, the inert gas introduced through the lower introduction port 60 is guided to an upper portion of the heating area in the furnace through the passage formed between the second core tube 30 and the wall of the furnace body 10 and the passage formed between the second core tube 30 and the atmosphere blocking tube 70.

In another embodiment not shown in the drawings, an insulating material can be installed between the furnace body 10 and the first and second graphite core tubes 20 and 30. In this case, there should be formed passages for the inert gas, of course.

Now, a method of drawing an optical fiber from a preform with use of the furnace of the invention constructed as above is explained in detail.

At first, a common supplying device (not shown) supplies a preform 100 into the furnace through the upper opening 11 of the furnace body 10. After that, an electric current is applied to the first and second graphite core tubes 20 and 30 from a power source (not shown) to heat the core tubes 20 and 30. Then, the preform 100 is heated and melted and an optical fiber 100' is drawn from the bottom end of the melted preform 100. The drawn optical fiber 100' is moved downward through the atmosphere blocking tube 70, and then coated with polymer on its surface. Then, the coated optical fiber is cured and taken up regularly around a bobbin.

During the above process, inert gases such as helium, nitrogen and argon are introduced through the upper, central and lower introduction ports 40, 50 and 60 so as to establish an inert gas atmosphere inside the furnace. A flow rate of the introduced inert gas is preferably adjusted depending on positions of the ports. Preferably, a flow rate of the inert gas at the central introduction port 50 is 3~4 times as large as that of the inert gas at the upper introduction port 40, and a flow rate of the inert gas at the lower introduction port 60 is 2~3 times as large as that of the inert gas at the upper introduction port 40.

At this time, the flow of the inert gas in the furnace is as indicated by arrows in FIG. 1. In other words, the inert gas introduced from the upper introduction port 40 is sprayed toward a surface of the preform and at the same time discharged outside through a gap between the upper opening 11 and the preform 100 together with the inert gas introduced through the central introduction port 50 and flowed upward, as described below. Thus, the inert gas introduced through the upper introduction port 40 blocks the inflow of the atmosphere into the furnace through the upper opening 11 and discharges minute particles from the furnace outside.

The inert gas introduced through the central introduction port 50 flows through the passage between the first core tube 20 and the wall of the furnace body 10, then changes its flowing direction due to the support flange 12 and the second core tube 30, and then flows upward through the passage between the first and second core tubes 20 and 30. The introduced inert gas carries impurity particles generated in the furnace while flowing upward along the inner wall of the first core tube 20. Then, the impurity particles are discharged outside through the upper opening 11 along with the inert gas introduced through the upper introduction port 40. The inert gas introduced through the central introduction port 50 partially changes its direction near the upper introduction port 40 and then flows downward along the surface of the preform 100.

According to the present invention, since the inert gas introduced into the furnace through the central introduction port 50 does not directly contact with the surface of the preform 100, an irregular turbulence flow is not generated. In other words, while flowing upward in the furnace and then flowing downward along the surface of the preform 100, the inert gas forms a uniform laminar flow near the surface of the preform 100.

The inert gas introduced through the lower introduction port 60 flows along the passage between the second core tube 30 and the wall of the furnace body 10 and then into the furnace through a gap between a lower end of the second core tube 30 and a bottom of the furnace body 10. The inert gas introduced through the lower introduction port 60 is not directly injected to the drawn optical fiber 100' but flow upward through the passage between the atmosphere blocking tube 70 and the second core tube 30 and then discharged outside through the blocking tube 70 together with the gas which is introduced through the central introduction port 50 and then descends along the surface of the preform 100. This inert gas prevents the inflow of the air from the outside at the lower portion of the furnace and also forms a uniform laminar flow on the surface of the drawn optical fiber 100' which passes through the atmosphere blocking tube 70.

Figure 4A:
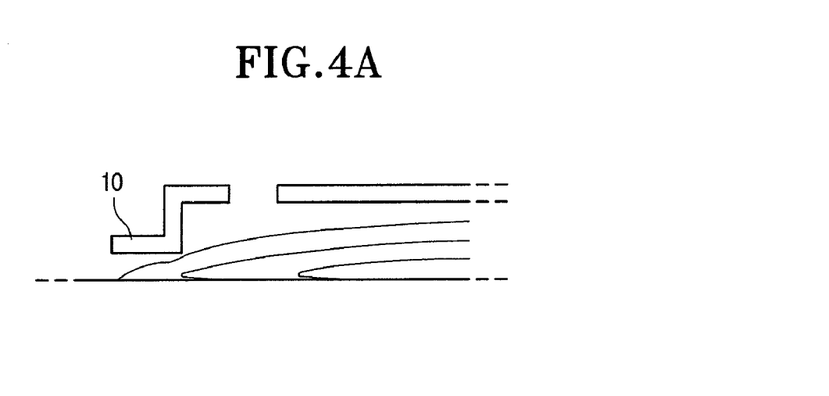
FIG. 4A shows a flow at a U area.
Figure 4B:
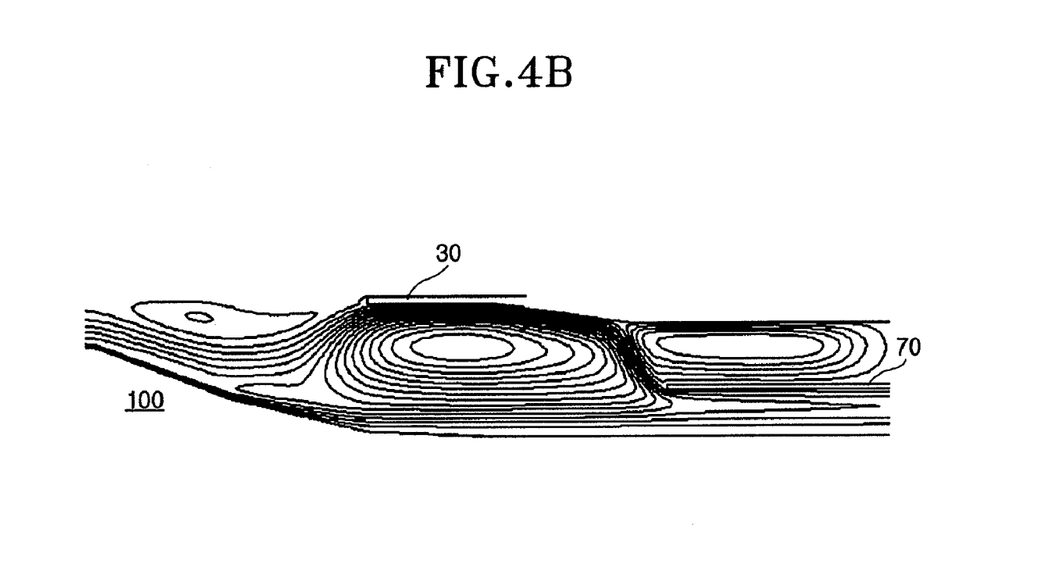
FIG. 4B shows a flow at an M area.
Figure 4C:
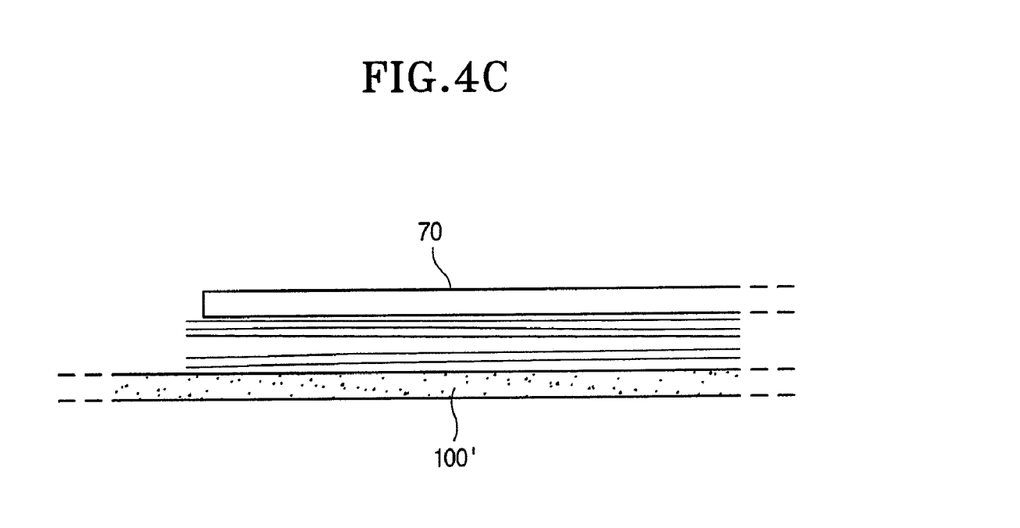
FIG. 4C shows a flow at an L area.

The flow distribution of the inert gas in the furnace according to the present invention is well shown in FIGS. 4A to 4C. In the figures, FIG. 4A shows a flow distribution of the inert gas at an upper portion U of the furnace, FIG. 4B shows a flow distribution of the inert gas at a central portion M of the furnace, and FIG. 4C shows a flow distribution at a lower portion L of the furnace. These figures are simulation results in case an argon gas of about 45° C. is introduced into the furnace through the upper introduction port 40 at a flow rate of $1.351 \times 10^{-4}$ kg/sec, through the central introduction port 50 at a flow rate of $4.866 \times 10^{-4}$ kg/sec, and through the lower introduction port 60 at a flow rate of $4.055 \times 10^{-4}$ kg/sec, respectively. At this time, the preform and the furnace body is spaced apart at the upper opening 11 by a distance of 1.5 mm. As shown in FIG. 4A, the inert gas in the furnace forms an air flow which is discharged outside through the opening 11. Particularly, as well known from FIG. 4B, a uniform laminar flow is formed along the surface of the preform 100 near the neck-down zone, and this laminar flow is maintained even inside the atmosphere blocking tube 70 shown in FIG. 4C. Thus, while passing through the atmosphere blocking tube 70, the optical fiber 100' drawn from the preform 100 may be slowly cooled with a gas boundary layer on its surface kept uniformly. Consequently, the drawn optical fiber 100' is cooled at a uniform speed in its circumferential direction, so the optical fiber may have a uniform stress distribution in the circumferential direction.

Figure 5A:
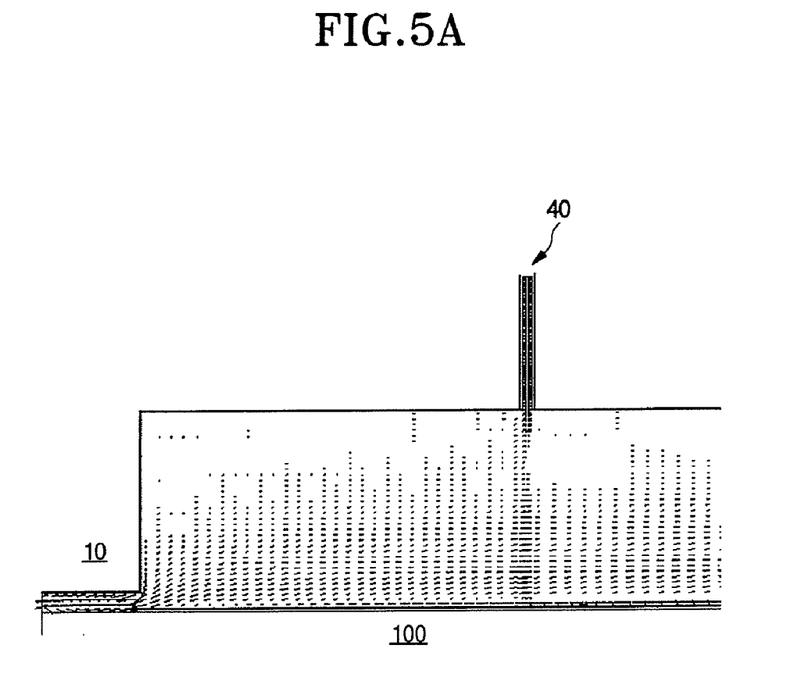
FIG. 5A shows a distribution at a U area.
Figure 5B:
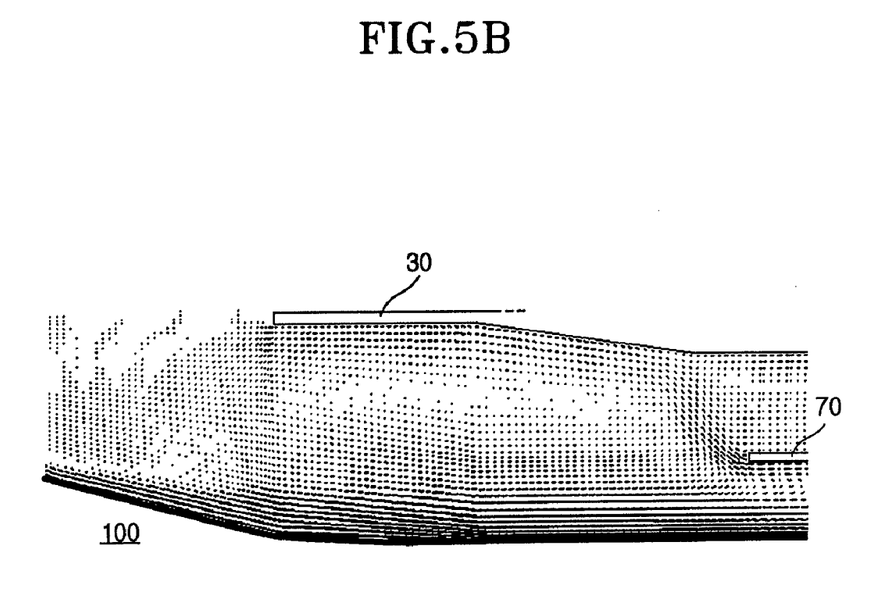
FIG. 5B shows a distribution at an M area.
Figure 5C:
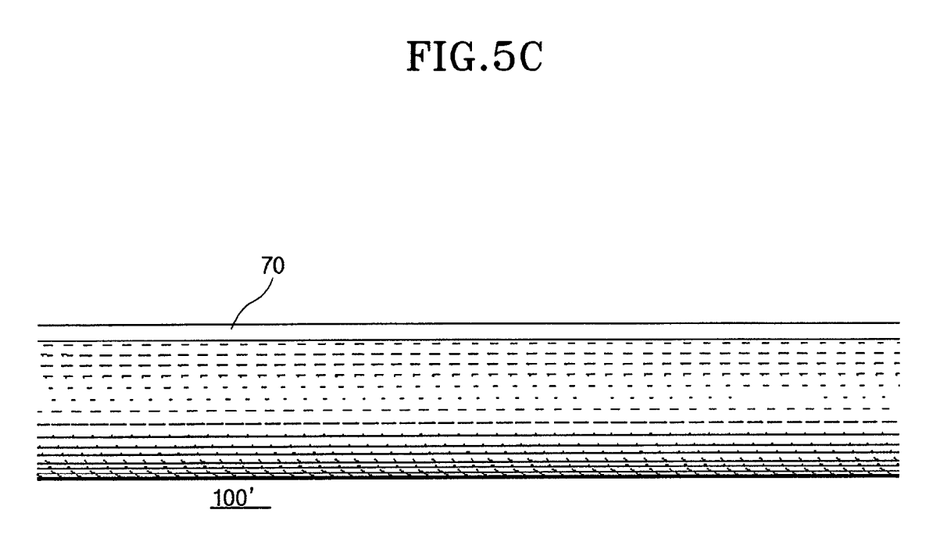
FIG. 5C shows a distribution at an L area.

In the above simulation, a flow velocity distribution of the inert gas introduced into the furnace at each point is well shown in FIGS. 5A to 5C. In these figures, FIG. 5A shows a flow velocity distribution at the upper portion U, FIG. 5B shows a flow velocity distribution at the central portion M, and FIG. 5C shows a flow velocity distribution at the lower portion L.

As shown in FIG. 5A, the inert gas introduced through the upper introduction port 40 flows up to the upper portion of the furnace together with the inert gas introduced through the central introduction port 50, and is then discharged through the upper opening 11 at a high speed. This shows that the inside of the furnace is protected from the atmosphere and also impurity particles in the furnace can be discharged well outside. As shown in FIG. 5B, the inert gas introduced through the central introduction port 50 flows up to the upper portion of the furnace and then changes its direction so as to flow down at a high speed along the surface of the preform with forming a uniform laminar flow on the surface of the preform. Furthermore, the flow is, as shown in FIG. 5C, kept to the inside of the atmosphere blocking tube 70 together with the inert gas introduced through the lower introduction port 60, forming a rapid laminar gas flow on the surface of the drawn optical fiber 100' and blocking the inflow of air.

In the present invention, a length of the atmosphere blocking tube 70 is suitably selected in order to ensure slow cooling of the drawn optical fiber 100'. Preferably, the length of the atmosphere blocking tube 70 is set so that the optical fiber discharged out of the atmosphere blocking tube 70 has a temperature of about 1,200~1,300° C.

EXPERIMENTAL EXAMPLE

An optical fiber preform is drawn using the fiber-drawing furnace according to the present invention. The furnace has a cylindrical shape of which an inside diameter is 110 mm and the length is 450 mm. An argon gas is introduced into the furnace at the flow rate of 5 liter/min through the upper introduction port 40, at the flow rate of 20 liter/min through the central introduction port 50, and at the flow rate of 10 liter/min through the lower introduction port 60, respectively. While the first graphite core tube 20 heats at 2,100° C. and the second graphite core tube 30 heats at 1,600° C., preform having a diameter of 90 mm is melt and an optical fiber is drawn from the perform at a rate of 10 m/sec, 20 m/sec and 25 m/sec, respectively. At this time, the atmosphere blocking tube 70 having an inside diameter of 25 mm, a thickness of 2 mm and a length of 2.0 m is installed only in the third case. Then, by using a laser non-contact diameter-measuring device, an outer diameter of the optical fiber is measured. The measured results are illustrated in Table 1.

TABLE 1

| | Atmosphere blocking tube | Drawing speed | Outer diameter variation |
|---|---|---|---|
| Case 1 | No | 10 m/sec | ±0.70 μm |
| Case 2 | No | 20 m/sec | ±1.50 μm |
| Case 3 | Provided | 25 m/sec | ±0.15 μm |

As well understood in Table 1, in case the atmosphere blocking tube is not installed, the outer diameter variation is relatively good when a drawing speed is 10 m/sec and the outer diameter variation is increased when a drawing speed is 20 m/sec or above.

In the third case, the atmosphere blocking tube is adopted to the furnace of the present invention. In this case, the outer diameter variation is satisfactory though a drawing speed of the optical fiber is high as much as 25 m/sec.

According to the present invention, since the atmosphere flowing in at the upper portion of the furnace can be blocked by means of simple structure of the upper opening, it is not needed to prepare a complex sealing device as used conventionally. In addition, the inert gas introduced at a central portion of the furnace is not directly injected to the preform, particularly the neck-down portion, but providing a stable flow stream. The inert gas also carries impurity particles, generated in the furnace, in the upper direction and so that the particles are fully discharged outside. In addition, the atmosphere blocking tube provided to a lower portion of the furnace protect the drawn optical fiber from the atmosphere as well as makes a stable laminar flow around the optical fiber so that the optical fiber can be slowly cooled to a temperature at which a viscosity of an outer cladding is sufficiently reduced. Furthermore, the inert gas introduced through the lower introduction port blocks inflow of the external air through the atmosphere blocking tube.

Such a effect of the present invention enables to draw an optical fiber with dramatically reduced diameter variations, restraining Polarization Mode Dispersion (PMD) and therefore improving a high-speed optical transmission characteristic through an optical fiber.

The present invention has been described in detail. However, it should be understood that the detailed description and specific examples, while indicating preferred embodiments of the invention, are given by way of illustration only, since various changes and modifications within the spirit and scope of the invention will become apparent to those skilled in the art from this detailed description.

What is claimed is:

1. A furnace for drawing an optical fiber comprising:
   a furnace body having an upper opening through which a preform may enter the furnace and a lower opening for discharging an optical fiber drawn from a preform, the furnace body further comprising an inner wall;
   a first core tube installed spaced apart from the inner wall of the furnace body to form a first passage between the first core tube and the inner wall of the furnace body, the first core tube forming a melting area therein to heat and melt a preform entering the furnace from the upper opening;
   a second core tube installed spaced apart from the inner wall of the furnace body to form a second passage between the second core tube and the inner wall of the furnace body, the second core tube having a diameter smaller than the first core tube, the second core tube being installed partially inserted into a lower end of the first core tube to thereby form a third passage, between the first and second core tubes;

an upper introduction port formed at an upper portion of the furnace body to permit introducing an inert gas toward a preform, a portion of such inert gas being dischargeable out of the furnace through the upper opening;

a central introduction port formed at a central portion of the furnace body, the port communicating from outside of the furnace body to the first passage formed between the first core tube and the inner wall of the furnace body, to permit introducing an inert gas into the first passage;

a lower introduction port formed at a lower portion of the furnace body, the port communicating from outside the furnace body to the second passage formed between the second core tube and the inner wall of the furnace body to permit introducing an inert gas into the second passage;

a support flange interposed between the first passage and second passage to divide the first passage and second passages; and an atmosphere blocking tube installed at the lower opening for forming a fourth passage in which inert gas introduced through the second passage can flows between the second core tube and the atmosphere blocking tube, the atmosphere blocking tube permitting the passage of a drawn optical fiber therethrough without immediate exposure of said drawn optical fiber to the atmosphere external to the furnace.

2. A furnace for drawing an optical fiber according to claim 1, wherein the third passage is formed near a neck-down zone of a preform.

3. A furnace for drawing an optical fiber according to claim 1, wherein a flow rate of an inert gas introduced at the central introduction port can be about 3 to 4 times as large as a flow rate of an inert gas at the upper introduction port, and wherein a flow rate of an inert gas at the lower introduction port can be about 2 to 3 times as large as a flow rate of an inert gas at the upper introduction port.

4. A furnace for drawing an optical fiber according to claim 1, further comprising a ring-shaped spraying sleeve having a plurality of nozzles for supplying an inert gas, introduced through the upper introduction port, evenly to the preform.

5. A furnace for drawing an optical fiber according to claim 1, wherein the atmosphere blocking tube has a length sufficient to protect a drawn optical fiber while such fiber has a temperature of between about 1,200° C. and about 1,300° C.

6. A furnace for drawing an optical fiber according to claim 5, wherein the length of the atmosphere blocking tube is in the range of between about 2.0M and 2.5M.

7. A furnace for drawing an optical fiber according to claim 5, wherein the upper end of the atmosphere blocking tube is positioned between about 200 mm and about 250 mm below a neck-down zone of a preform.

* * * * *